United States Patent
Roy Chowdhury et al.

(10) Patent No.: US 11,205,095 B2
(45) Date of Patent: *Dec. 21, 2021

(54) METHODS AND SYSTEMS FOR THE FAST ESTIMATION OF THREE-DIMENSIONAL BOUNDING BOXES AND DRIVABLE SURFACES USING LIDAR POINT CLOUDS

(71) Applicant: Volvo Car Corporation, Gothenburg (SE)

(72) Inventors: Sohini Roy Chowdhury, Mountain View, CA (US); Srikar Muppirisetty, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,061

(22) Filed: Dec. 1, 2020

(65) Prior Publication Data

US 2021/0081714 A1 Mar. 18, 2021

Related U.S. Application Data

(63) Continuation of application No. 16/171,992, filed on Oct. 26, 2018, now Pat. No. 10,872,269.

(51) Int. Cl.
*G06K 9/62* (2006.01)
*G06T 7/62* (2017.01)
(Continued)

(52) U.S. Cl.
CPC ......... *G06K 9/6256* (2013.01); *G05D 1/0088* (2013.01); *G05D 1/0221* (2013.01);
(Continued)

(58) Field of Classification Search
None
See application file for complete search history.

(56) References Cited

U.S. PATENT DOCUMENTS 9,600,892 B2 3/2017 Patel et al.
10,872,269 B2 * 12/2020 Roy Chowdhury . G05D 1/0248
(Continued)

OTHER PUBLICATIONS

Himmelsbach et al., "Tracking and Classification of Arbitrary Objects with Bottom-Up/Top-Down Detection,2012 Intelligent Vehicles Symposium", Spain, Jun. 3-7, 2012, pp. 1-6.
(Continued)

*Primary Examiner* — Dov Popovici
(74) *Attorney, Agent, or Firm* — Clements Bernard Walker; Christopher L. Bernard

(57) ABSTRACT

Methods and systems for generating annotated data for training vehicular driver assist (DA) and autonomous driving (AD) active safety (AS) functionalities and the like. More specifically, methods and systems for the fast estimation of three-dimensional (3-D) bounding boxes and drivable surfaces using LIDAR point clouds and the like. These methods and systems provide fast and accurate annotation cluster pre-proposals on a minimally-supervised or unsupervised basis, segment drivable surfaces/ground planes in a bird's-eye-view (BEV) construct, and provide fast and accurate annotation cluster pre-proposal labels based on the feature-based detection of similar objects in already-annotated frames. The methods and systems minimize the expertise, time, and expense associated with the manual annotation of LIDAR point clouds and the like in the generation of annotated data for training machine learning (ML) algorithms and the like.

20 Claims, 14 Drawing Sheets

(51) Int. Cl.
*G06N 20/00* (2019.01)
*G05D 1/00* (2006.01)
*G05D 1/02* (2020.01)
*G06K 9/00* (2006.01)

(52) U.S. Cl.
CPC ....... *G05D 1/0248* (2013.01); *G06K 9/00805* (2013.01); *G06N 20/00* (2019.01); *G06T 7/62* (2017.01); *G06T 2207/10028* (2013.01); *G06T 2207/30252* (2013.01)

(56) References Cited

U.S. PATENT DOCUMENTS

2016/0154999 A1* 6/2016 Fan .......................... G06T 7/11
 382/103
2017/0116781 A1* 4/2017 Babahajiani ............ G06T 17/20

OTHER PUBLICATIONS

Naujoks et al.,"An Orientation Corrected Bounding Box Fit Based on the Convex Hull under Real Time Constraints.", 2018 IEEE Vehicles Symposium (IV), China, Jun. 26-30, 2018, pp. 1-6.
Copyright Statement.
CF Form 1507, Application No. 19204489.9, pp. 1-4.
Feb. 7, 2020, Communication received from Extended European Search Report for Application No. 19204489.9.
Information on Search Strategy for Application No. EP19204489.
Jan. 22, 2020, European Search Report issued on International Application No. 19204489, pp. 1-2.

* cited by examiner

Linearity: $L_\lambda = \dfrac{e_1 - e_2}{e_1}$

Planarity: $P_\lambda = \dfrac{e_2 - e_3}{e_1}$

Scattering: $S_\lambda = \dfrac{e_3}{e_1}$

Omnivariance: $O_\lambda = \sqrt[3]{e_1 \, e_2 \, e_3}$

Anisotropy: $A_\lambda = \dfrac{e_1 - e_3}{e_1}$

Eigenentropy: $E_\lambda = -\sum\limits_{i=1}^{3} e_i \ln(e_i)$

Sum of eigenvalues: $\Sigma_\lambda = e_1 + e_2 + e_3$

Change of curvature: $C_\lambda = \dfrac{e_3}{e_1 + e_2 + e_3}$

*Fig. 6*

METHODS AND SYSTEMS FOR THE FAST ESTIMATION OF THREE-DIMENSIONAL BOUNDING BOXES AND DRIVABLE SURFACES USING LIDAR POINT CLOUDS

CROSS-REFERENCE TO RELATED APPLICATION

The present disclosure is a continuation (CON) of co-pending U.S. patent application Ser. No. 16/171,992, filed on Oct. 26, 2018, and entitled "METHODS AND SYSTEMS FOR THE FAST ESTIMATION OF THREE-DIMENSIONAL BOUNDING BOXES AND DRIVABLE SURFACES USING LIDAR POINT CLOUDS," the contents of which are incorporated in full by reference herein.

TECHNICAL FIELD

The present disclosure relates generally to methods and systems for generating annotated data for training vehicular driver assist (DA) and autonomous driving (AD) active safety (AS) functionalities and the like. More specifically, the present disclosure relates to methods and systems for the fast estimation of three-dimensional (3-D) bounding boxes and drivable surfaces using LIDAR point clouds and the like. These methods and systems provide fast and accurate annotation cluster pre-proposals on a minimally-supervised or unsupervised basis, segment drivable surfaces/ground planes in a bird's-eye-view (BEV) construct, and provide fast and accurate annotation cluster pre-proposal labels based on the feature-based detection of similar objects in already-annotated frames. The methods and systems minimize the expertise, time, and expense associated with the manual annotation of LIDAR point clouds and the like in the generation of annotated data for training machine learning (ML) algorithms and the like.

BACKGROUND

Vehicular DA and AD systems rely heavily on 3-D LIDAR point clouds and the like for visual sensing and control. For example, LIDAR point clouds are important in situations where camera images sometimes fail, providing visual acuity in low light (i.e., night), shadowed, and low-standing sun driving conditions. While LIDAR point clouds capture 3-D textural information related to objects, they do not capture color information related to the objects. All automated ML algorithms for 3-D bounding box detection using LIDAR point clouds rely on the use of annotated data for training. This presents two significant problems.

First, in general, the manual annotation of 3-D data is time consuming and expensive, as compared to the manual annotation of image data. This process is prone to errors. The availability of fast and accurate pre-proposals generated by minimally-supervised or unsupervised algorithms can greatly reduce the expertise, time, and expense associated with the manual annotation of such data. Thus, what is needed in the art is a method and system for providing fast and accurate annotation cluster pre-proposals on a minimally-supervised or unsupervised basis, as well as segmenting drivable surfaces/ground planes in a BEV construct, for example.

Second, the automated detection of unusual stationary objects in DA and AD applications can pose reasonable doubt to manual annotators and adequately training or re-training manual annotators can be expensive. The automated detection of such unusual stationary objects thus poses data scalability issues. Thus, what is still needed in the art is a method and system for providing fast and accurate annotation cluster pre-proposal labels based on the feature-based detection of similar objects in already-annotated frames, thereby alleviating ambiguity in the manual annotation process. The rapid pre-population of both stationary and non-stationary annotation labels would provide real time training for manual annotators as they learn from similarly-structured objects and already-annotated frames.

SUMMARY

In various aspects, the present disclosure provides methods and systems for the fast estimation of 3-D bounding boxes and drivable surfaces using LIDAR point clouds and the like. These methods and systems provide fast and accurate annotation cluster pre-proposals on a minimally-supervised or unsupervised basis, segment drivable surfaces/ground planes in a two-dimensional (2-D) BEV construct, and provide fast and accurate annotation cluster pre-proposal labels based on the feature-based detection of similar objects in already-annotated frames. The methods and systems minimize the expertise, time, and expense associated with the manual annotation of LIDAR point clouds and the like in the generation of annotated data for training ML algorithms and the like. The annotated LIDAR point clouds of the present disclosure provide dependable insight (both 3-D bounding boxes for stationary and non-stationary objects and segmented drivable surfaces/ground planes) for vision-based sensing tasks that are more robust to lighting condition variations than camera-based DA and AD systems, for example. Structural features are used to detect similarly-structured objects in previously used LIDAR point cloud frames, enabling the fast population of sparsely-encountered object categories and helping to train manual annotators.

The present disclosure provides an automated clustering algorithm to detect 3-D bounding boxes around the various objects in a LIDAR point cloud frame. These 3-D bounding boxes can then be treated as pre-proposals that can be manually corrected, thereby enabling fast annotations. Automated pre-proposals are generated for drivable surfaces/ground planes in a 2-D BEV construct, which can then be projected back to the associated 3-D LIDAR point clouds, again enabling fast annotations. Similarly-shaped objects are detected in previously used LIDAR point cloud frames in the feature domain to reduce ambiguity while annotating and to help train manual annotators.

In one aspect, the present disclosure provides a method for the estimation of three-dimensional object bounding boxes in a three-dimensional point cloud, the method including: given a three-dimensional point cloud, identifying and removing a ground plane from the three-dimensional point cloud; clustering foreground points remaining after the ground plane is removed from the three-dimensional point cloud to generate one or more object clusters representing one or more objects; and fitting a three-dimensional bounding box around each of the one or more object clusters representing the one or more objects. The method further includes providing the three-dimensional bounding box disposed around each of the one or more object clusters representing the one or more objects to an annotator as an annotation pre-proposal that can be modified by the annotator. The three-dimensional point cloud includes a three-dimensional LIDAR point cloud obtained by a vehicular system. The three-dimensional point cloud and the three-dimensional bounding box disposed around each of the one or more object clusters representing the one or more objects are used to train a machine learning algorithm. The method further includes applying an angular orientation correction to the one or more object clusters representing the one or more objects. The method further includes extracting a plurality of structural, textural, and/or density features from each of the one or more object clusters representing the one or more objects using one or more of an Eigen value-based technique and an ensemble shape. The method further includes comparing the extracted plurality of structural, textural, and/or density features to a plurality of structural, textural, and/or density features extracted from one or more previously-detected objects using a classifier, such as K-nearest neighbor, Random Forest, and/or Adaboost, to provide an object label for the point cloud cluster under analysis. Thus, point cloud clustering followed by estimation of a best fit 3-D bounding box, along with angular correction, provides the necessary 3-D bounding box pre-proposals around stationary and non-stationary objects in a frame, while feature extraction followed by classification provides object class labels (e.g. car, large vehicle, pedestrian, etc.) to each object in the frame. Identifying and removing the ground plane from the three-dimensional point cloud includes dividing the three-dimensional point cloud into height-thresholded radial bins and using the associated thresholds to distinguish ground plane points from foreground points. Clustering the foreground points remaining after the ground plane is removed from the three-dimensional point cloud to generate the one or more object clusters representing the one or more objects includes applying an unsupervised or minimally-supervised density-based spatial clustering of applications with noise algorithm or Euclidean clustering technique to the foreground points. Fitting the three-dimensional bounding box around each of the one or more object clusters representing the one or more objects includes estimation of the point cloud cluster center as the center of the 3-D bounding box, followed by estimation of bounding box extrema positions in the x, y, and z axes, which is then followed by estimation of eight 3-D corner points (for 3-D bounding boxes) that ensure minimum volume and surface area for the 3-D bounding box estimate (to ensure a tight 3-D bounding box). Further, 3-D angular correction is enforced for determining the eight corner points per object such that the 3-D angles are: pitch ($\beta$=0) and roll ($\gamma$=0). This process ensures that all 3-D bounding boxes are aligned to the ground plane surface.

In another aspect, the present disclosure provides a system for the estimation of three-dimensional object bounding boxes in a three-dimensional point cloud, the system including: a processor including software executing coded instructions operable for: given a three-dimensional point cloud, identifying and removing a ground plane from the three-dimensional point cloud; clustering foreground points remaining after the ground plane is removed from the three-dimensional point cloud to generate one or more object clusters representing one or more objects; and fitting a three-dimensional bounding box around each of the one or more object clusters representing the one or more objects. The coded instructions are further operable for providing the three-dimensional bounding box disposed around each of the one or more object clusters representing the one or more objects to an annotator as an annotation pre-proposal that can be modified by the annotator. The three-dimensional point cloud includes a three-dimensional LIDAR point cloud obtained by a vehicular system. The three-dimensional point cloud and the three-dimensional bounding box disposed around each of the one or more object clusters representing the one or more objects are used to train a machine learning algorithm. The coded instructions are further operable for applying an angular orientation correction to the one or more object clusters representing the one or more objects. The coded instructions are further operable for extracting a plurality of structural, textural, and/or density features from each of the one or more object clusters representing the one or more objects using one or more of an Eigen value-based technique and an ensemble shape. The coded instructions are further operable for comparing the extracted plurality of structural, textural, and/or density features to a plurality of structural, textural, and/or density features extracted from one or more previously-detected objects using a classifier, such as K-nearest neighbor, Random Forest, and/or Adaboost, to provide an object label for the point cloud cluster under analysis. Thus, point cloud clustering followed by estimation of a best fit 3-D bounding box, along with angular correction, provides the necessary 3-D bounding box pre-proposals around stationary and non-stationary objects in a frame, while feature extraction followed by classification provides object class labels (e.g. car, large vehicle, pedestrian, etc.) to each object in the frame. Identifying and removing the ground plane from the three-dimensional point cloud includes dividing the three-dimensional point cloud into height-thresholded radial bins and using the associated thresholds to distinguish ground plane points from foreground points. Clustering the foreground points remaining after the ground plane is removed from the three-dimensional point cloud to generate the one or more object clusters representing the one or more objects includes applying an unsupervised or minimally-supervised density-based spatial clustering of applications with noise algorithm or Euclidean clustering technique to the foreground points. Fitting the three-dimensional bounding box around each of the one or more object clusters representing the one or more objects includes estimation of the point cloud cluster center as the center of the 3-D bounding box, followed by estimation of bounding box extrema positions in the x, y, and z axes, which is then followed by estimation of eight 3-D corner points (for 3-D bounding boxes) that ensure minimum volume and surface area for the 3-D bounding box estimate (to ensure a tight 3-D bounding box). Further, 3-D angular correction is enforced for determining the eight corner points per object such that the 3-D angles are: pitch ($\beta$=0) and roll ($\gamma$=0). This process ensures that all 3-D bounding boxes are aligned to the ground plane surface.

In a further aspect, the present disclosure provides a method for providing automated a proposal for drivable surface segmentation in a three-dimensional point cloud, the method including: given a three-dimensional point cloud with an estimated ground plane, transforming the estimated ground plane to a bird's-eye-view image; modifying the estimated ground plane in the bird's-eye-view image to form a modified ground plane; and transforming the modified ground plane back to a modified three-dimensional point cloud.

In a still further aspect, the present disclosure provides a method for identifying an object in a feature-space associated with a three-dimensional point cloud, the method including: extracting a plurality of structural, textural, and/or density features from an object cluster representing an object using one or more of an Eigen value-based technique and an ensemble shape; and comparing the extracted plurality of structural, textural, and/or density features to a plurality of structural, textural, and/or density features extracted from one or more previously-detected objects using a classifier, such as K-nearest neighbor, Random Forest, and/or Adaboost, to provide an object label for the point cloud cluster under analysis. Thus, point cloud clustering followed by estimation of a best fit 3-D bounding box, along with angular correction, provides the necessary 3-D bounding box pre-proposals around stationary and non-stationary objects in a frame, while feature extraction followed by classification provides object class labels (e.g. car, large vehicle, pedestrian, etc.) to each object in the frame.

BRIEF DESCRIPTION OF THE DRAWINGS

The present disclosure is illustrated and described herein with reference to the various drawings, in which like reference numbers are used to denote like method steps/system components, as appropriate, and in which:

FIG. 6 is a table illustrating various Eigen value (EV) features used in the feature extraction step of the present disclosure;

DESCRIPTION OF ILLUSTRATIVE EMBODIMENTS

Again, the present disclosure provides methods and systems for the fast estimation of 3-D bounding boxes and drivable surfaces using LIDAR point clouds and the like. These methods and systems provide fast and accurate annotation cluster pre-proposals on a minimally-supervised or unsupervised basis, segment drivable surfaces/ground planes in a 2-D BEV construct, and provide fast and accurate annotation cluster pre-proposal labels based on the feature-based detection of similar objects in already-annotated frames. The methods and systems minimize the expertise, time, and expense associated with the manual annotation of LIDAR point clouds and the like in the generation of annotated data for training ML algorithms and the like. The annotated LIDAR point clouds of the present disclosure provide dependable insight (both 3-D bounding boxes for stationary and non-stationary objects and segmented drivable surfaces/ground planes) for vision-based sensing tasks that are more robust to lighting condition variations than camera-based DA and AD systems, for example. Structural features are used to detect similarly-structured objects in previously used LIDAR point cloud frames, enabling the fast population of sparsely-encountered object categories and helping to train manual annotators.

Figure 1:
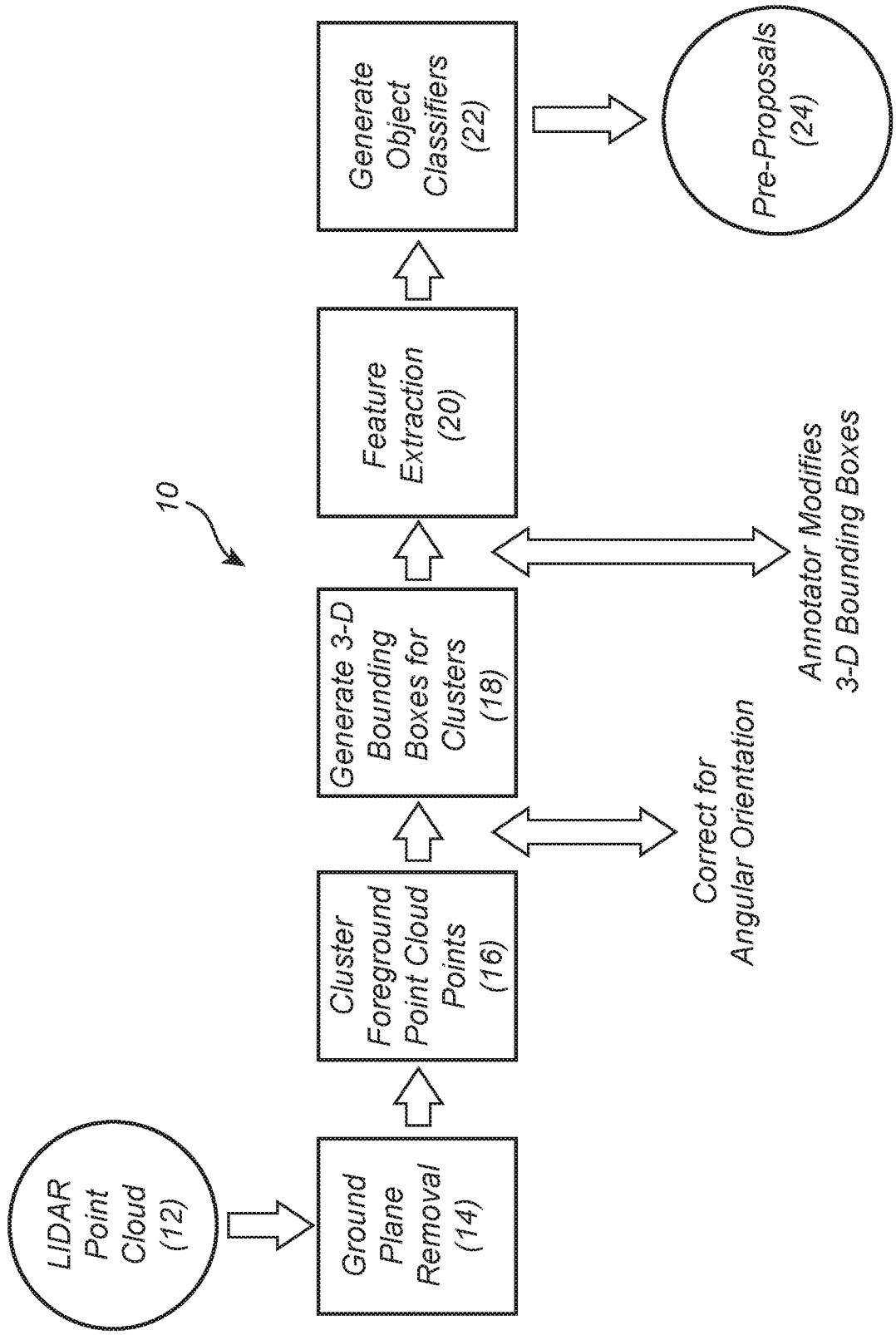
FIG. 1 is a flowchart illustrating one exemplary method for generating 3-D bounding boxes around objects in a LIDAR point cloud in an automated manner and, optionally, extracting features from the bounded objects, comparing the extracted features to those associated with previously-detected objects, and attaching proposed classifier labels to the bounded objects, thereby providing an annotation pre-proposal to an annotator.

Referring now specifically to FIG. 1, the 3-D bounding box generation/annotation algorithm 10 of the present disclosure includes, given a LIDAR point cloud 12 to be annotated and subsequently used to train a ML algorithm, first removing the ground plane from the point cloud 12 (step 14). This eliminates a source of errors from the 3-D bounding boxes ultimately generated. It can be performed by the thresholded binning of radial point clouds, for example. Second, the remaining foreground point cloud points are clustered (step 16). At this point, a correction can be made for the angular orientation inherent in the LIDAR image. For example, in this vehicular application, it is known that all the observed objects are present on or about the drivable surface/ground plane present in front of the vehicle. Third, 3-D bounding boxes are generated for all of the generated clusters (step 18). Subsequently, these 3-D bounding box pre-proposals can be modified by the annotator. Fourth, optionally, feature extraction can be performed for all of the bounded objects (step 20). Fifth, optionally, the extracted features are compared to features extracted for other, previously-detected objects and, when a match is found, an object label pre-proposal is provided for each bounded object (step 22). This can involve using Random Forest (RF) classifiers, for example. The output is a plurality of clusters with 3-D bounding boxes and associated object labels 24, representing a plurality of annotation pre-proposals presented to the annotator. Each of these steps is described in greater detail herein below.

Figure 2:
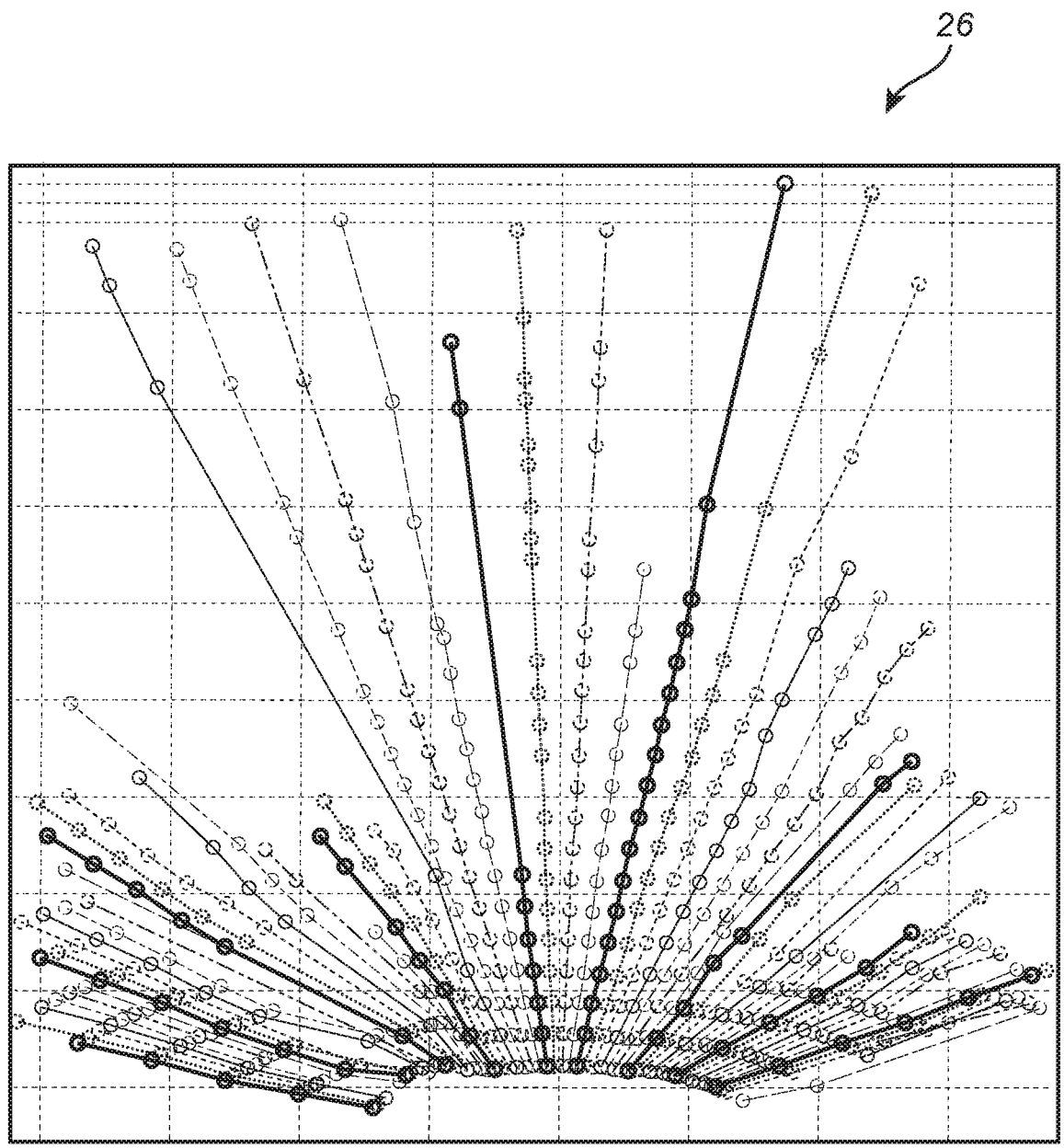
FIG. 2 is a plot illustrating radial bins generated for a LIDAR point cloud, with each radial bin adding points to generate the radial segments.
Figure 3:
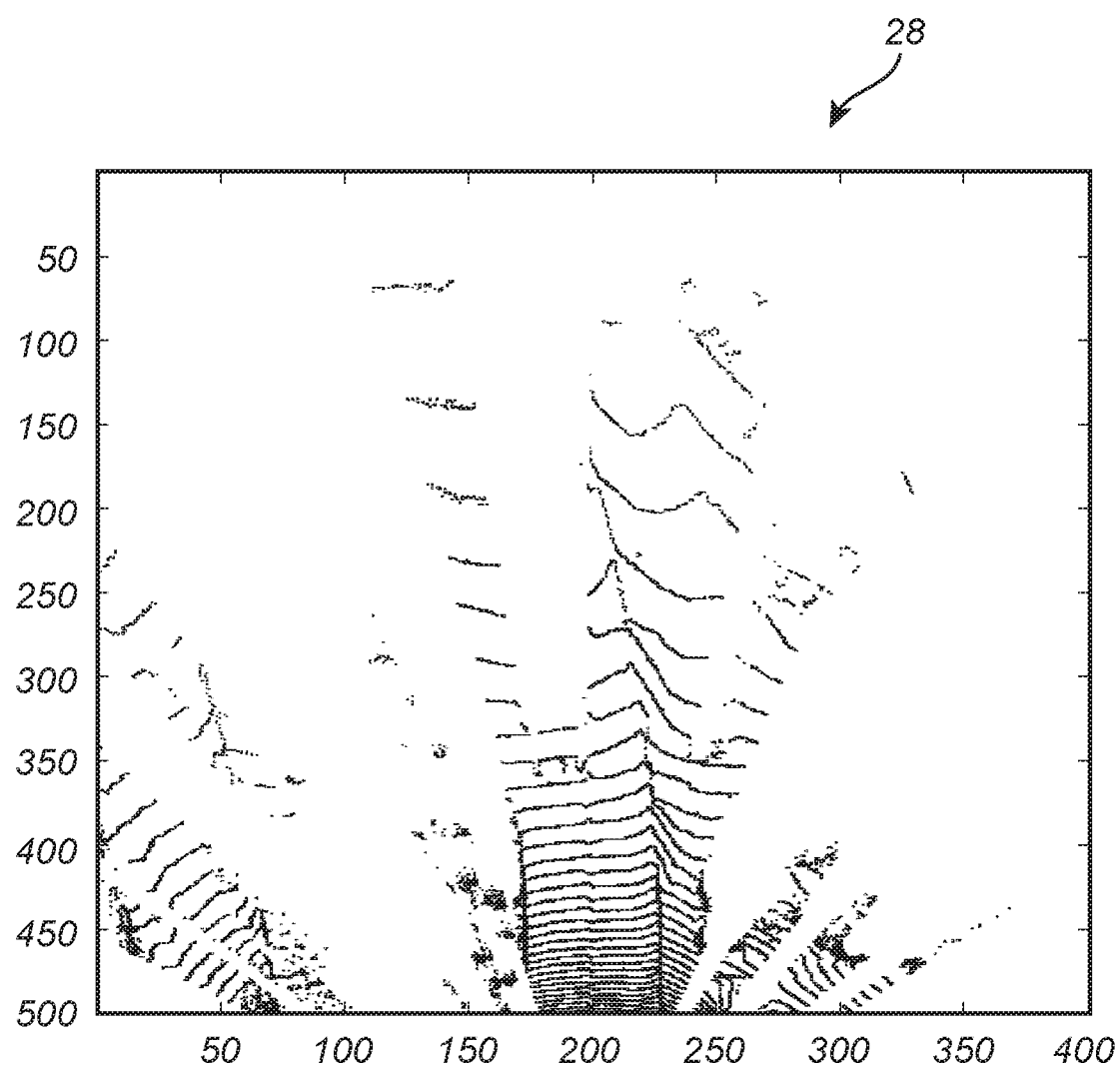
FIG. 3 is a plot illustrating a BEV of the ground plane detected by the radial binning process illustrated in FIG. 2.

Referring now specifically to FIGS. 2 and 3, the first step for generating 3-D bounding box pre-proposals for LIDAR point clouds is removing the ground plane that could otherwise generate clutter and false positives for objects disposed on the ground plane. The complete field of view is divided into radial bins. For example, FIG. 2 illustrates 3-degree radial bins 26 for the 180-degree field of view disposed ahead of the LIDAR sensor used, although other size radial bins 26 could be used equally. Thus, each radial bin 26 is 'n' degrees away from its nearest neighbor(s). For each radial bin 26, radial segments are generated by adding points from the LIDAR point cloud that are at the same relative height (i.e., z-coordinate) from the ground plane. Points are added from proximate to the LIDAR sensor to remote from the LIDAR sensor for each radial bin 26. Corresponding to each radial segment, a best fit line estimate is generated followed by the identification of remaining points from the LIDAR point cloud that are "close" (i.e., based on the Euclidean distance within a threshold) to the radial segment and at a similar height (i.e., z-coordinate) as the points in the radial segment. All points that are identified as being part of the radial segments, and points "close" to the radial segments, are identified as the ground plane and all remaining points become the foreground points that are subsequently subjected to clustering. FIG. 3 is a plot illustrating a BEV of the ground plane detected by the radial binning process illustrated in FIG. 2.

In the next step, a point cloud is inputted after removing the ground plane and point cloud clusters are outputted. Once the ground plane is removed, the remaining points are clustered using an unsupervised or minimally-supervised methodology, well known to persons of ordinary skill in the art, such as density-based spatial clustering of applications with noise (DBSCAN) or Euclidean clustering. Given a set of points, DBSCAN and the like, associate and group points that are closely packed together, such as points associated with a particular object in the LIDAR frame.

In the next step, the point cloud clusters are inputted and associated 3-D bounding boxes are outputted. At this point, a correction can be made for the angular orientation inherent in the LIDAR image. For example, in this vehicular application, it is known that all the observed objects are present on or about the drivable surface/ground plane present in front of the vehicle. The 3-D bounding boxes preferably enclose all LIDAR points in each cluster. Fitting the 3-D bounding box around each object cluster representing a particular object includes estimation of the point cloud cluster center as the center of the 3-D bounding box, followed by estimation of bounding box extrema positions in the x, y, and z axes, which is then followed by estimation of eight 3-D corner points (for 3-D bounding boxes) that ensure minimum volume and surface area for the 3-D bounding box estimate (to ensure a tight 3-D bounding box). Further, 3-D angular correction is enforced for determining the eight corner points per object such that the 3-D angles are: pitch ($\beta=0$) and roll ($\gamma=0$). This process ensures that all 3-D bounding boxes are aligned to the ground plane surface. At this point, the resulting bounding box pre-proposals can be presented to the annotator and modified as desired.

Optionally, feature extraction is then performed. The inputs are clustered point clouds with bounding boxes and the outputs are features extracted for each point cloud. These extracted features are suitable for use with a classifier. It should be noted that, for LIDAR point clouds, only structural, textural, and/or density features are extracted, and not colors. Feature extraction is carried out using two different exemplary techniques. The first is an EV-based technique. EVs are computed from each clustered object and multiple features are extracted, namely linearity, planarity, scattering, omnivariance, anisotropy, Eigenentropy, and change of curvature. The second is an ensemble shape function (ESF)-based technique. This technique gives multiple histograms of different shape functions, for example ten 64-sized histograms of different shape functions providing 640 features per object cluster. One shape function, D2, is a histogram created based on the distance between points for each clustered object and can be used to differentiate rough shapes, for example. Another shape function, A3, encodes the angle information from three randomly selected points from the point cloud. This shape function encapsulates a different aspect of the underlying object and therefore increases the descriptiveness of the overall descriptor. A further shape function, D3, is similar to the D2 shape function but, instead of the two points associated with D2, three points are selected from the point cloud and the area enclosed by these points is encoded into the histogram. Other comparable methodologies are known to persons of ordinary skill in the art and can be used equally.

Optionally, in the classifier step, the features extracted from each clustered object are inputted and object label classifications are outputted. The features extracted in the previous step are provided to an object classifier. State-of-the-art classifiers, such as K-nearest neighbor, RF, Adaboost, and combination classifiers, can be used to classify the objects Preferably, the software application and algorithms of the present disclosure are implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, LIDAR sensor, etc.

The memory may include any of volatile memory elements (e.g., random access memory (RAM, such as DRAM, SRAM, SDRAM, etc.)), non-volatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" that provides various functionality.

Thus, again, the present disclosure provides methods and systems for the fast estimation of 3-D bounding boxes and drivable surfaces using LIDAR point clouds and the like. These methods and systems provide fast and accurate annotation cluster pre-proposals on a minimally-supervised or unsupervised basis, segment drivable surfaces/ground planes in a 2-D BEV construct, and provide fast and accurate annotation cluster pre-proposal labels based on the feature-based detection of similar objects in already-annotated frames. The methods and systems minimize the expertise, time, and expense associated with the manual annotation of LIDAR point clouds and the like in the generation of annotated data for training ML algorithms and the like. The annotated LIDAR point clouds of the present disclosure provide dependable insight (both 3-D bounding boxes for stationary and non-stationary objects and segmented drivable surfaces/ground planes) for vision-based sensing tasks that are more robust to lighting condition variations than camera-based DA and AD systems, for example. Structural features are used to detect similarly-structured objects in previously used LIDAR point cloud frames, enabling the fast population of sparsely-encountered object categories and helping to train manual annotators.

Figure 4A:
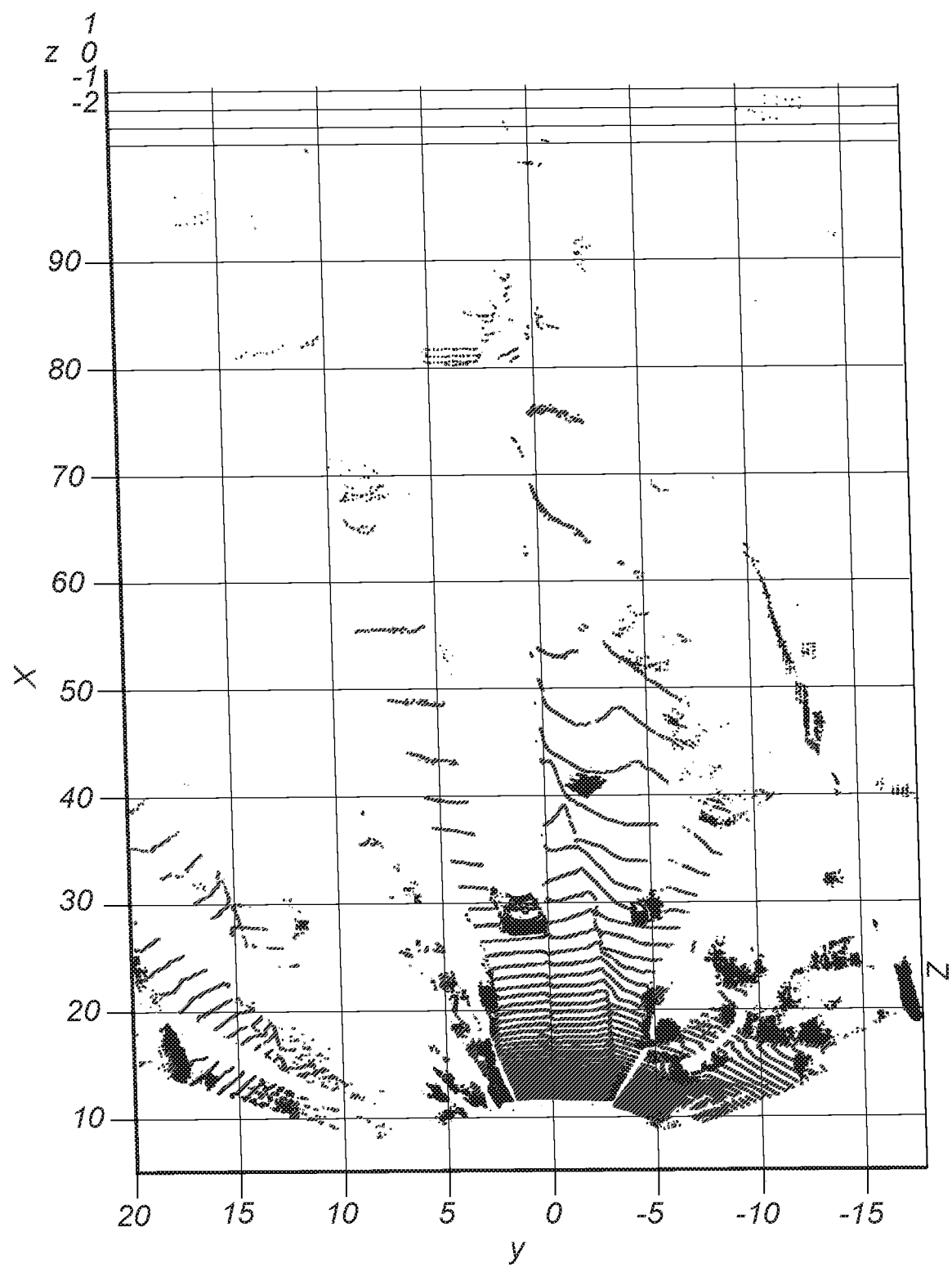
FIGS. 4a and 4b are LIDAR point clouds illustrating the results of the ground plane removal step of the present disclosure.
Figure 4B:
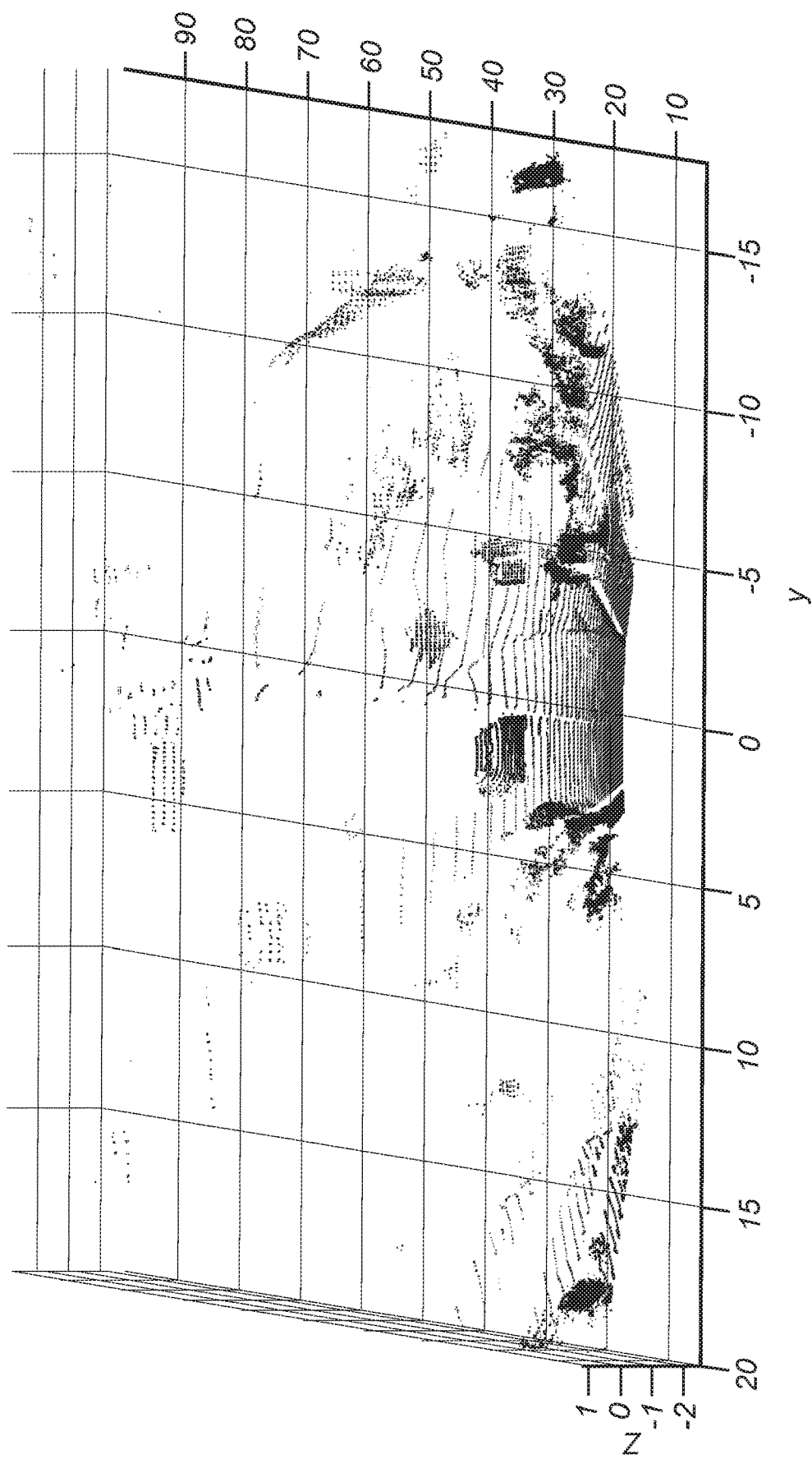

FIGS. 4a and 4b are a series of LIDAR point clouds illustrating the results of the ground plane removal step of the present disclosure, with the following exemplary field of view: x-axis ahead [5:100]m, y-axis left-right [−20:20]m.

Figure 5:
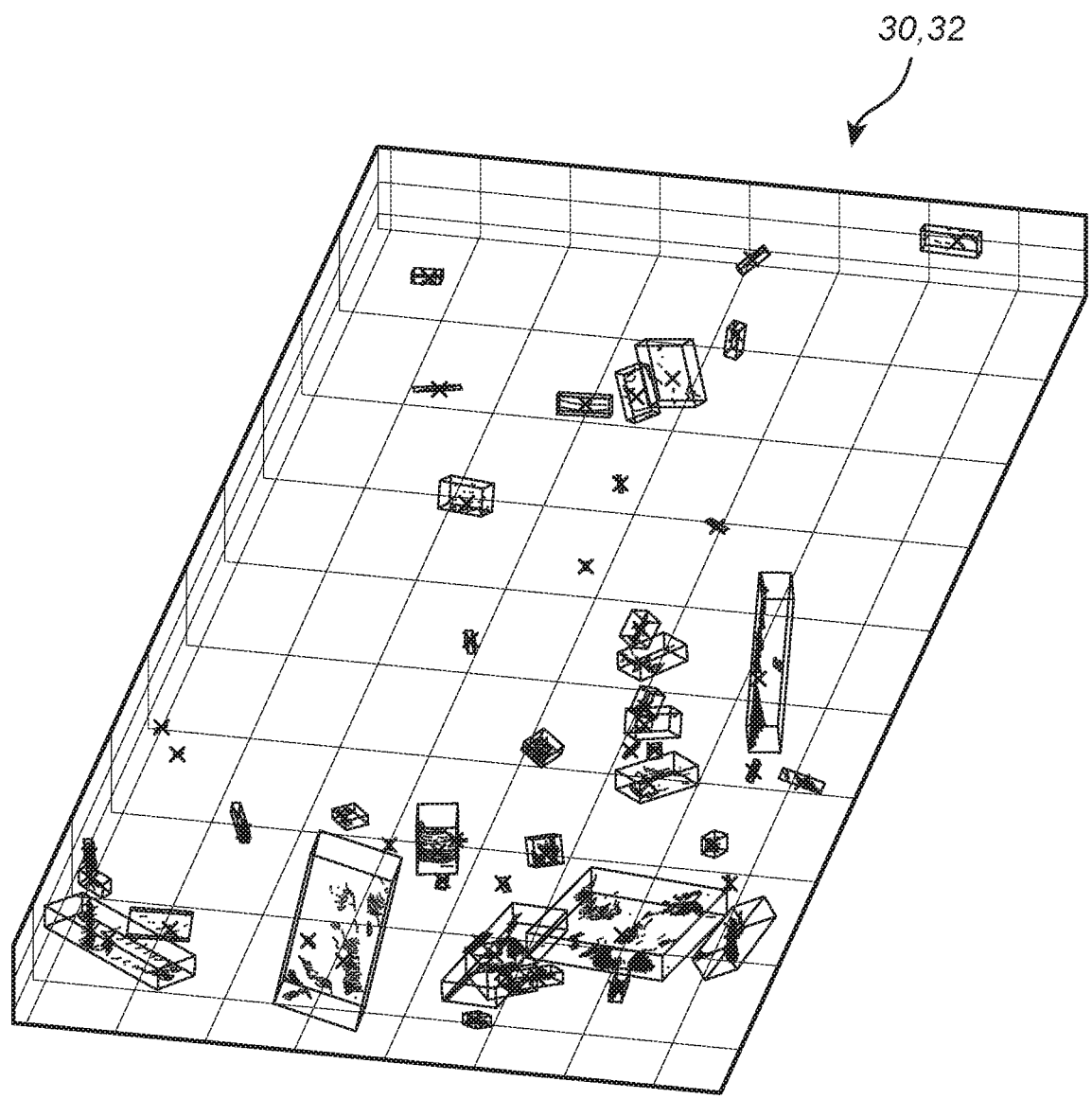
FIG. 5 is a LIDAR point cloud illustrating the result of the foreground clustering and 3-D bounding box generation steps of the present disclosure.

FIG. 5 is a LIDAR point cloud illustrating the result of the foreground clustering and 3-D bounding box generation steps of the present disclosure, highlighting the various cluster centroids 30 and associated 3-D bounding boxes 32. It should be noted here that the 3-D bounding boxes 32 are set apart from the apparent ground plane. This is corrected by the angular orientation correction described herein above.

FIG. 6 is a table illustrating various EV features used in the feature extraction step of the present disclosure, namely linearity, planarity, scattering, omnivariance, anisotropy, Eigenentropy, sum of EVs, and change of curvature. The various ESFs in the ESF-based technique include: D2, a histogram based on the distance between randomly selected points; D3, a histogram based on the area between randomly selected triplets; and A3, a histogram based on the angles between two lines that are obtained from these triplets.

Figure 7A:
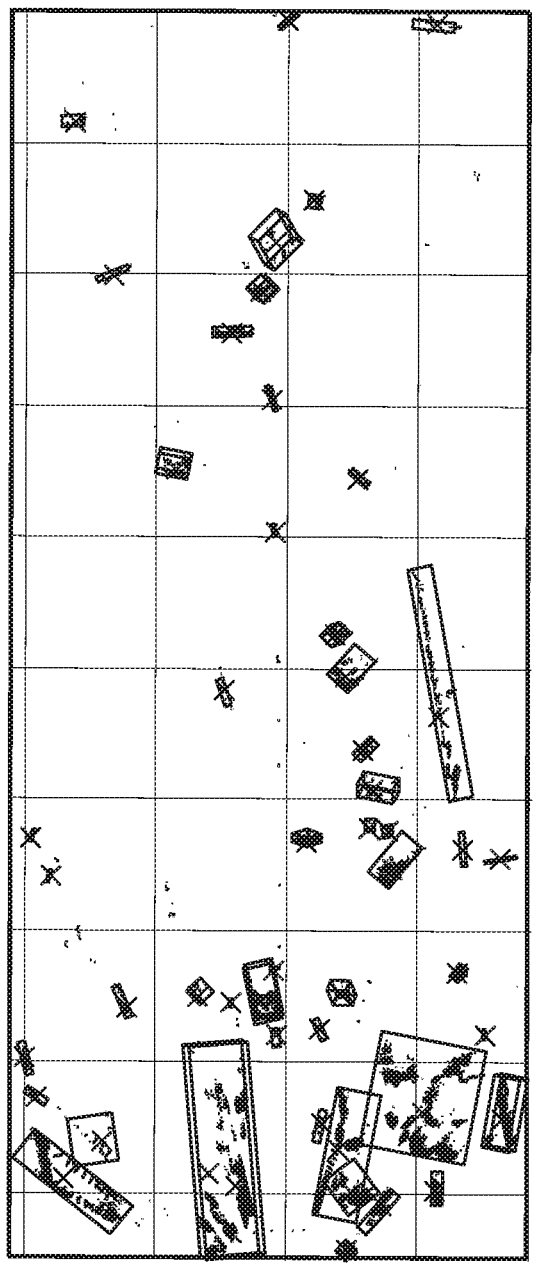
FIGS. 7a and 7b are LIDAR point clouds illustrating the results of the object classification step of the present disclosure.
Figure 7B:
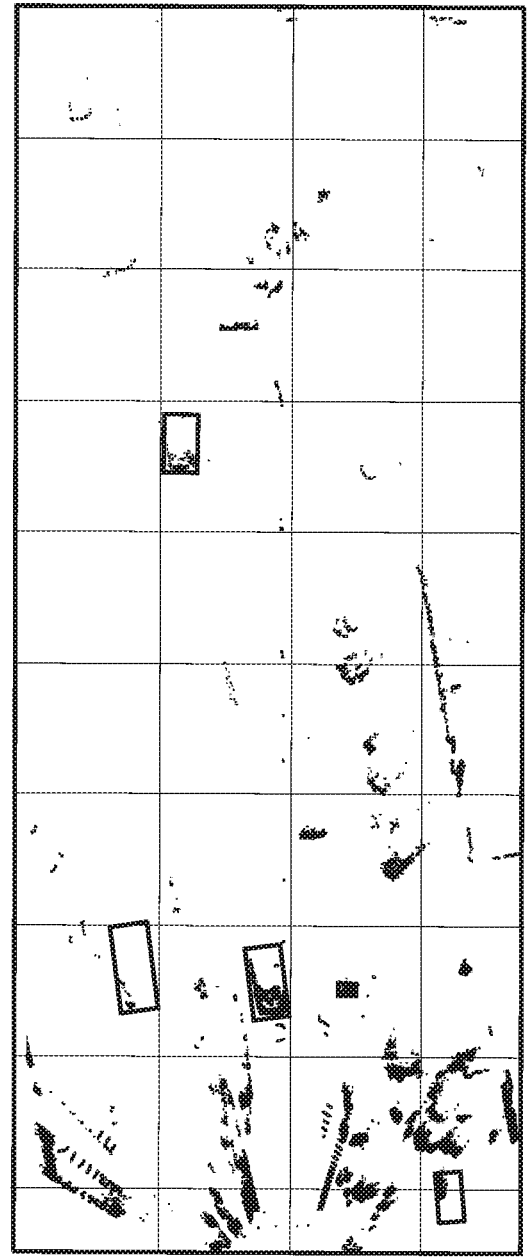

FIGS. 7a and 7b are LIDAR point clouds illustrating the results of the object classification step of the present disclosure, highlighting the extracted foreground clusters and the groundtruth labels (e.g., small vehicle, large vehicle, human, etc.).

Figure 8A:
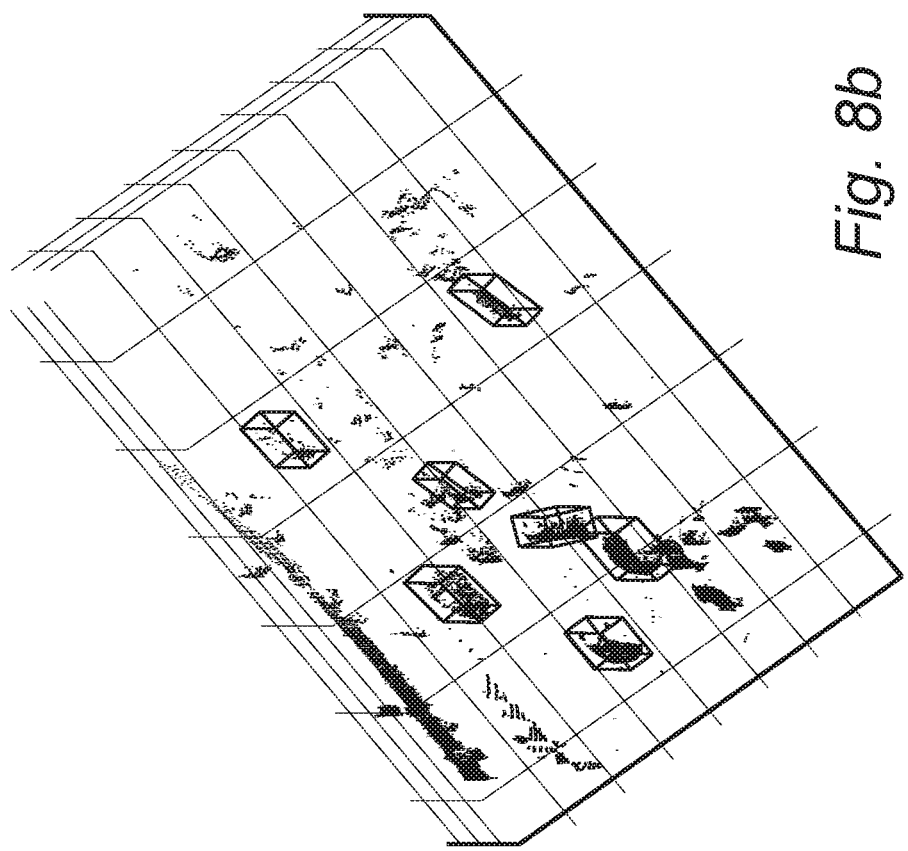
FIGS. 8a and 8b are LIDAR point clouds illustrating clustered and annotated objects, respectively, obtained using the methods and systems of the present disclosure.
Figure 8B:
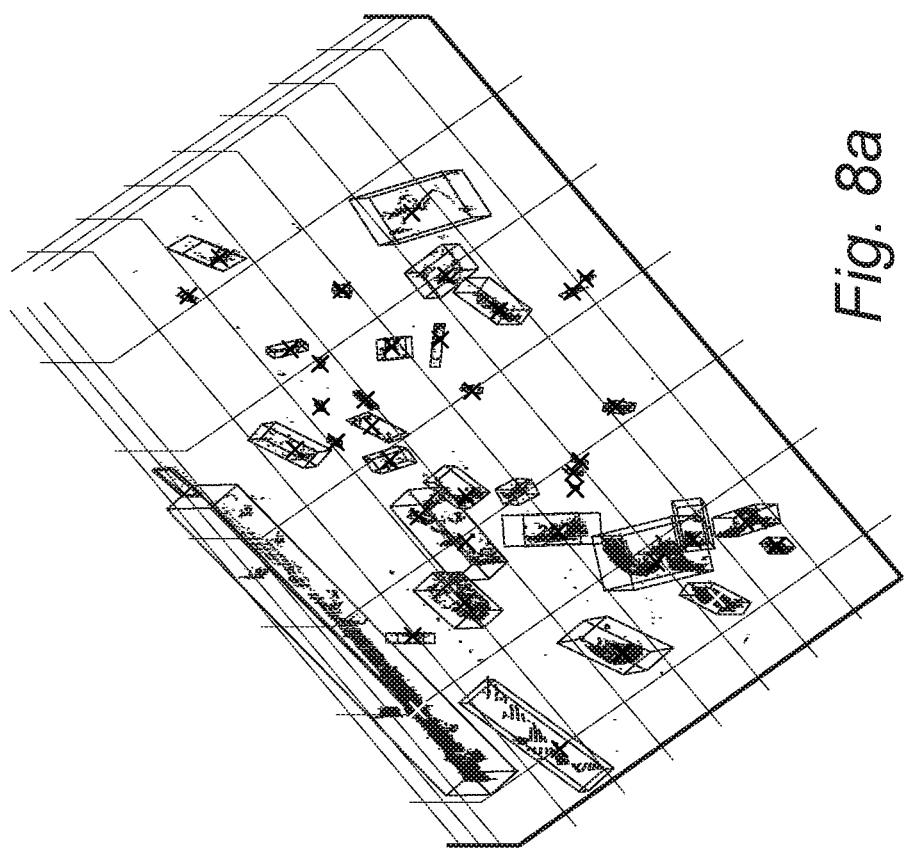

FIGS. 8a and 8b are LIDAR point clouds illustrating clustered and annotated objects, respectively, obtained using the methods and systems of the present disclosure. Note, the clustered objects in FIG. 8a include most of the bounding boxes from the annotated objects in FIG. 8b, plus additional clusters corresponding to false positives and stationary and/or unannotated objects.

Figure 9:
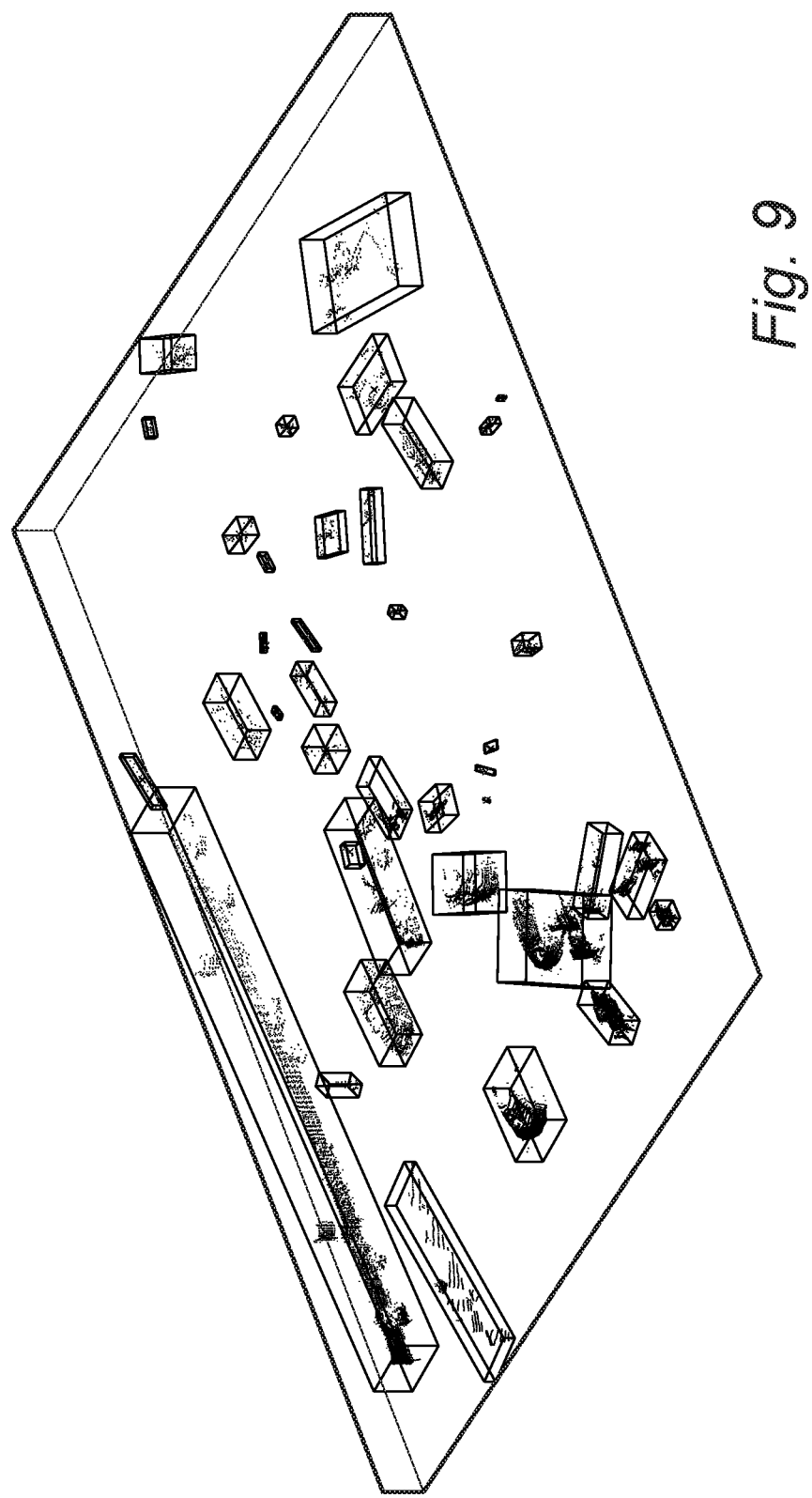
FIG. 9 is a LIDAR point cloud illustrating the result of the foreground clustering and 3-D bounding box generation steps of the present disclosure, with angular orientation correction applied.

FIG. 9 is a LIDAR point cloud illustrating the result of the foreground clustering and 3-D bounding box generation steps of the present disclosure, with the angular orientation correction described herein above applied.

Figure 10:
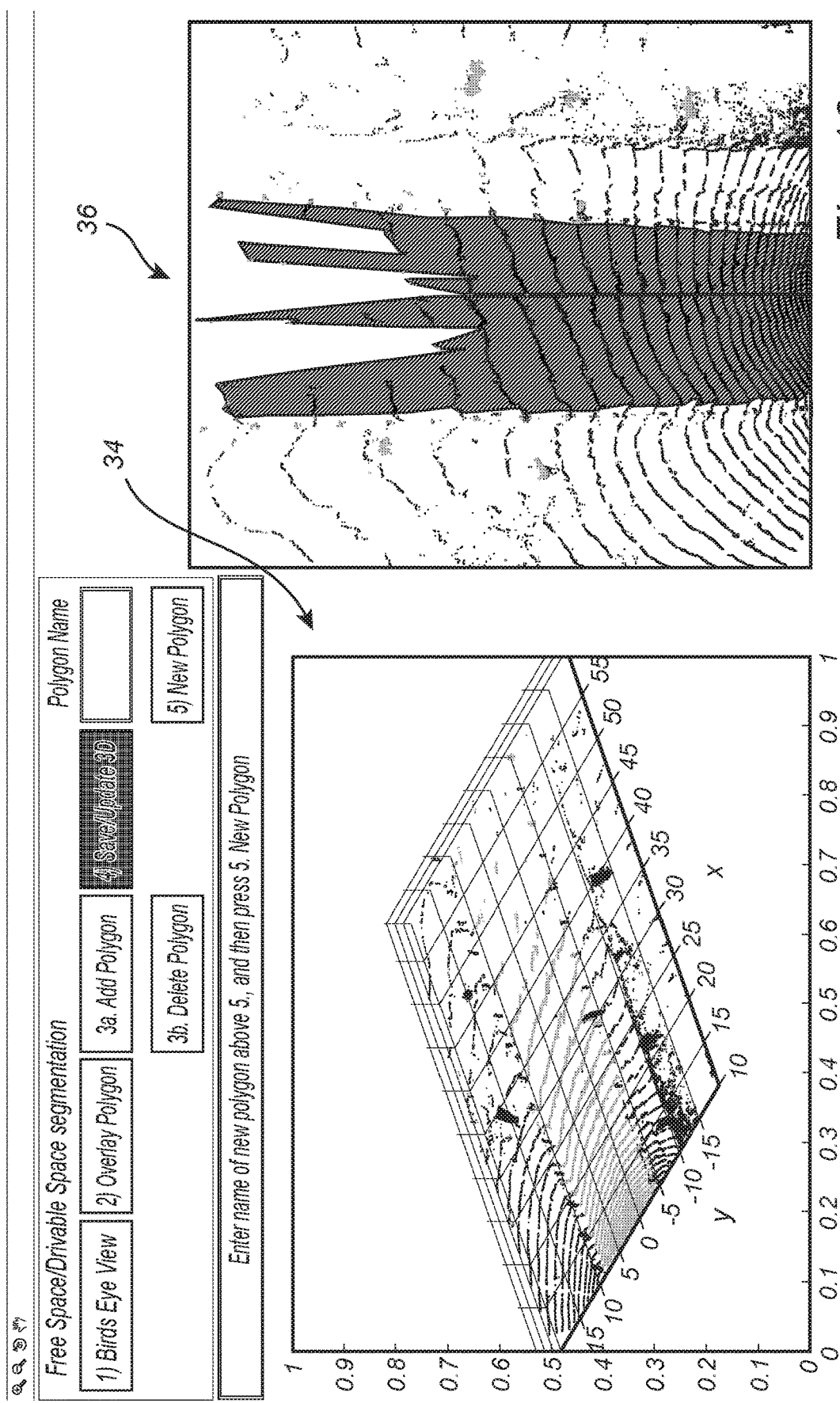
FIG. 10 is a LIDAR point cloud and a BEV image illustrating one step in the method for segmenting a drivable surface/ground plane of the present disclosure, highlighting a transformation, T, from the LIDAR point cloud to the BEV image.
Figure 11:
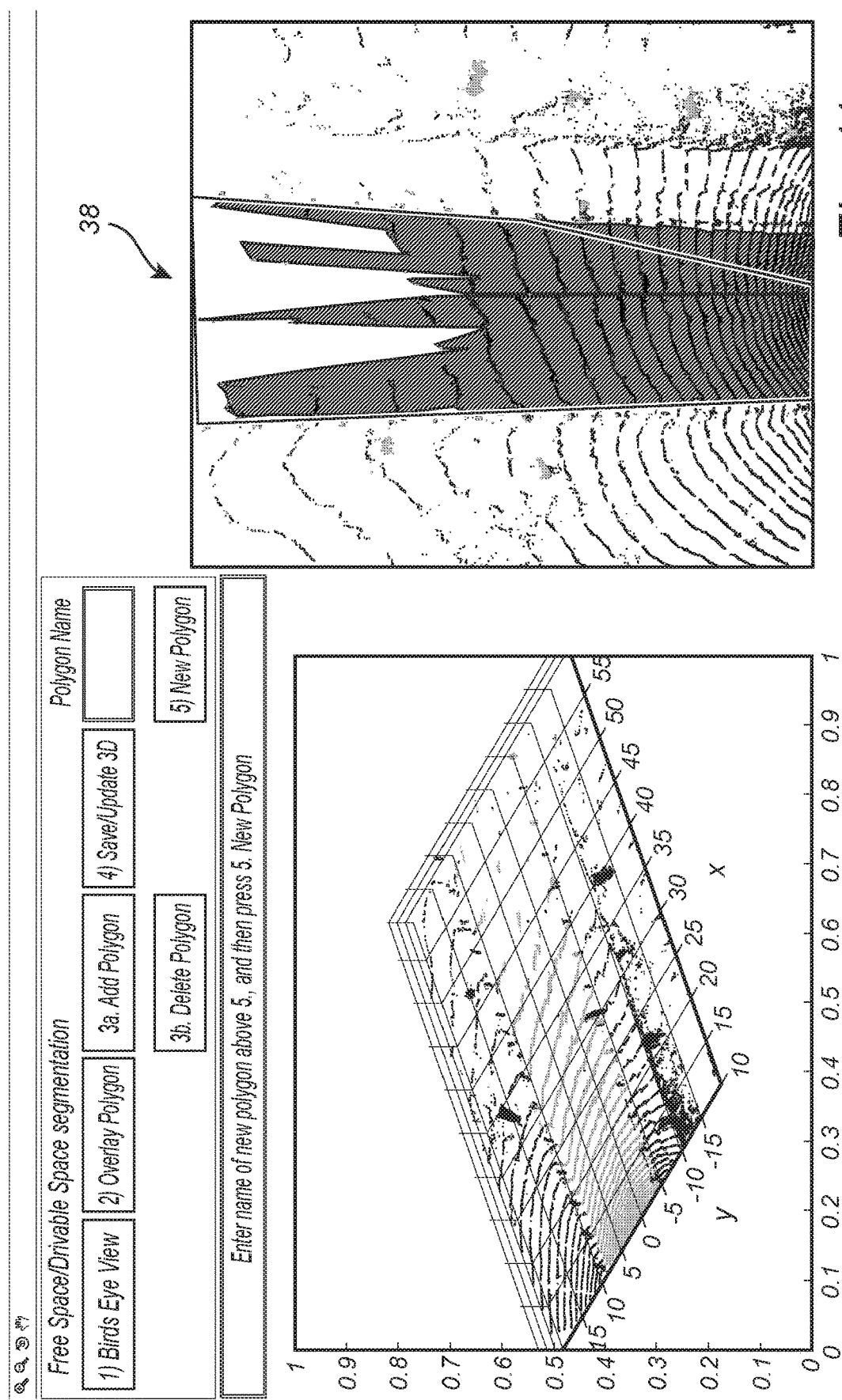
FIG. 11 is a LIDAR point cloud and a BEV image illustrating another step in the method for segmenting a drivable surface/ground plane of the present disclosure, highlighting corrections made to the drivable surface/ground plane in the BEV image.
Figure 12:
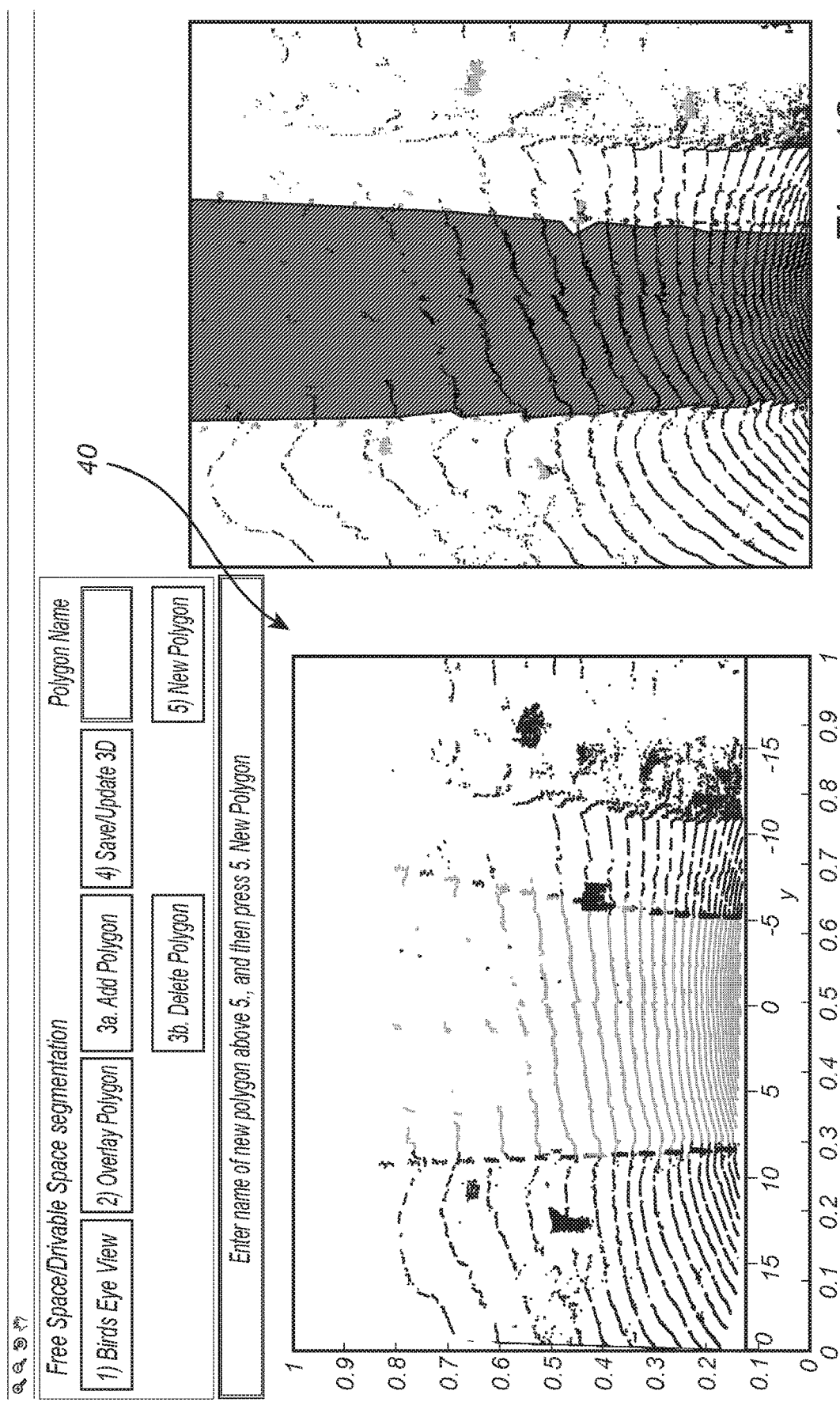
FIG. 12 is a BEV image and a LIDAR point cloud illustrating a further step in the method for segmenting a drivable surface/ground plane of the present disclosure, highlighting a transformation, $T^{-1}$, back from the BEV image to the LIDAR point cloud.

FIG. 10 illustrates one step in the method for fast segmentation of a drivable surface/ground plane of the present disclosure, highlighting a transformation, T, from the LIDAR point cloud 34 to the BEV image 36. FIG. 11 illustrates another step in the method for segmenting a drivable surface/ground plane of the present disclosure, highlighting corrections made to the drivable surface/ground plane in the BEV image, collectively 38. FIG. 12 illustrates a further step in the method for segmenting a drivable surface/ground plane of the present disclosure, highlighting a transformation, $T^{-1}$, back from the BEV image to the LIDAR point cloud, collectively 40. The segmentation of a drivable surface in a 3-D plane involves a highly complex process of grabbing/selecting a group of 3-D points. To enable fast pre-proposals for the ground plane, the transformation 'T' describes mapping the 3-D point cloud voxel space to a 2-D pixel space (i.e., BEV image). This 'T' transformation process proceeds by mapping the y-axis of the point clouds to the x-axis of a 2-D image, mapping the x-axis of the point clouds to the y-axis of the 2-D image and discarding the z-axis of point clouds, followed by adjusting the LIDAR source center. The point clouds that have already been detected as the ground plane (using the unsupervised radial binning approach described herein above) are subjected to the 'T' transformation, followed by the generation of a convex hull around the selected ground pixel points that are "close" based on Euclidean distance to the radial bins. This convex hull demarcates the 2-D pre-proposal for the drivable surface. This convex hull can then be manually modified by the annotator to accurately match the drivable surface. Finally, the inverse of the 'T' transformation is applied to the corrected 2-D drivable surface to counter for LIDAR source location correction followed by mapping the x-axis pixels of the drivable surface in 2-D to the y-axis in the point cloud and y-axis pixels in 2-D to the x-axis of the point cloud. This process completes accurate ground plane segmentation of LIDAR point clouds with low computational complexity.

Figure 13A:
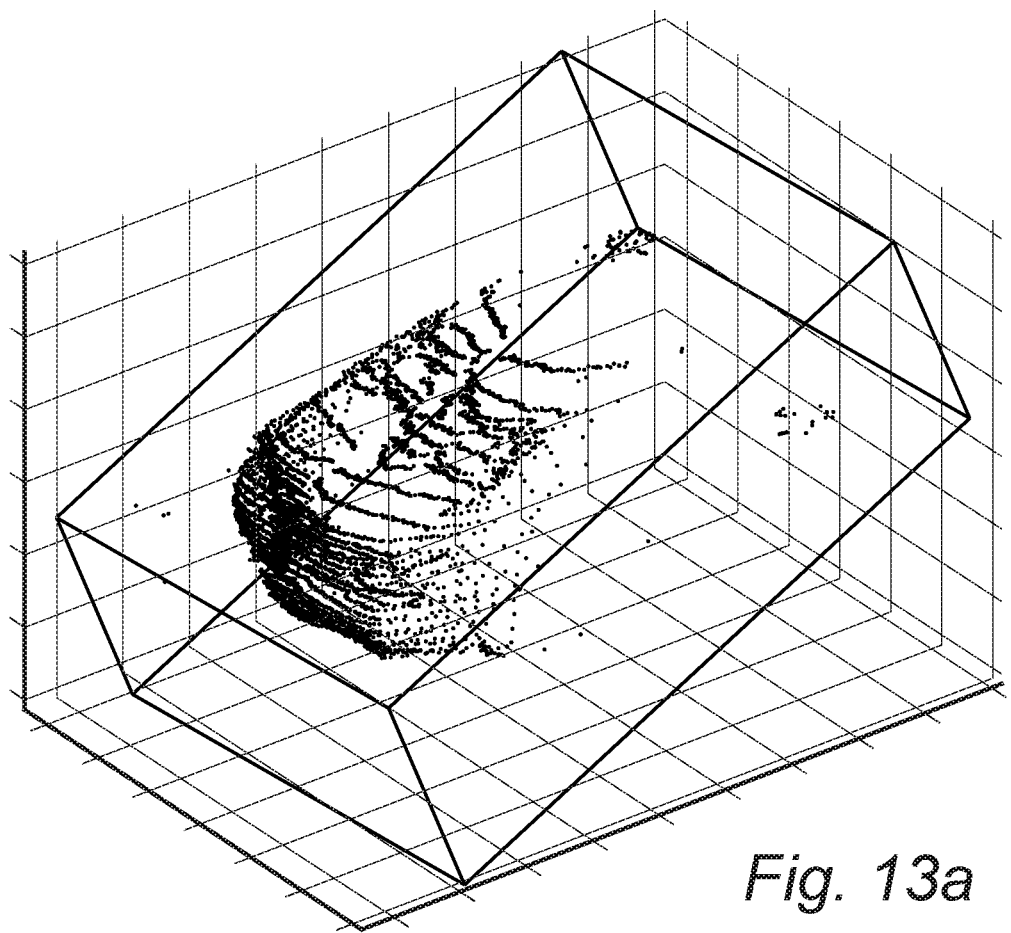
FIGS. 13a and 13b are LIDAR point clouds illustrating similar vehicles identified across different frames using the methods and systems of the present disclosure.
Figure 13B:
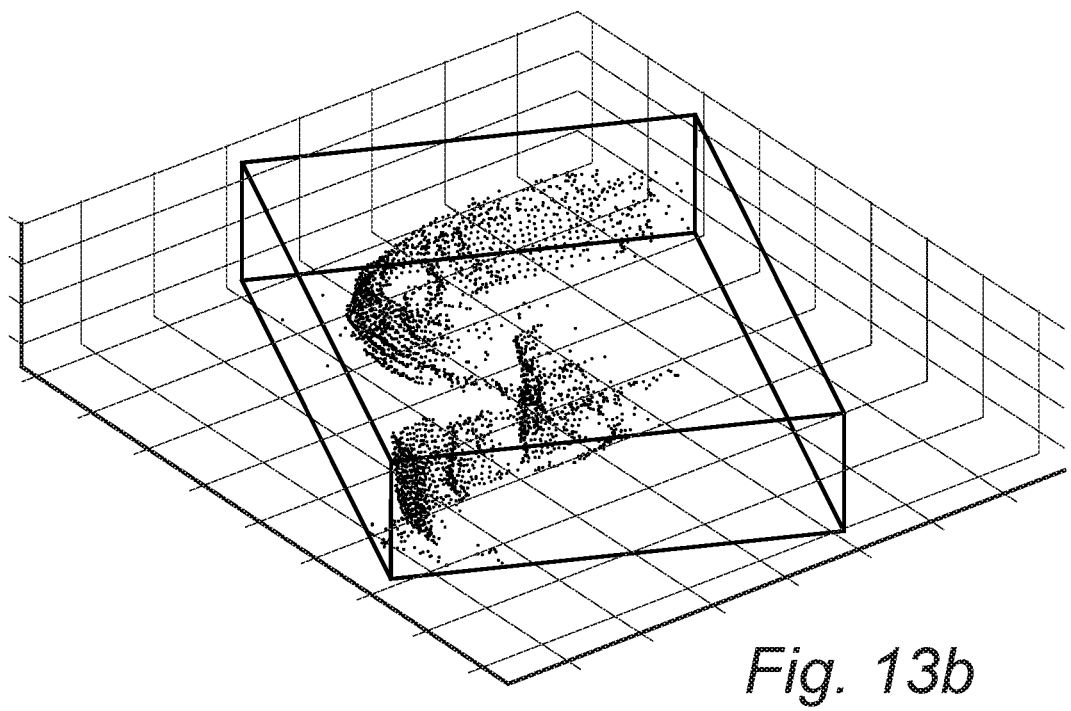

Finally, FIGS. 13a and 13b are LIDAR point clouds illustrating similar vehicles identified across different frames using the methods and systems of the present disclosure. The present disclosure helps identify "similarly"-shaped objects in a point cloud frame from frames that have been previously seen by the annotator. This aids on-the-job training for the annotator and reduces ambiguity in labelling 3-D objects. The process of identifying "similar" objects proceeds as follows. Let the point clouds per object be represented by a four-dimensional (4-D) matrix, X=[n×4], the 1st, $2^{nd}$, and 3rd columns represent the x, y, and z coordinates, respectively, the 4th column represents the surface reflectance, and n represents the number of 3-D points. The best estimate for the 3-D bounding box includes: [cx,cy,cz,dx,dy,dz,θ], where [cx,cy,cz] represents the center of the 3-D bounding box, [dx,dy,dz] represents the dimensions of the 3-D bounding box in the x, y, and z coordinates and 'θ' represents the lateral angle of the object (i.e., the yaw). The primary features for identifying "similarly"-shaped objects are: [dx, dy,dz,density], where density=n/(dx*dy*dz). For a further fine-tuned similarity measure, the 640 features per object used for classification can be utilized.

Although the present disclosure is illustrated and described herein with reference to aspects and examples thereof, it will be readily apparent to persons of ordinary skill in the art that other aspects and examples can perform similar functions and/or achieve like results. All such equivalent aspects and examples are within the spirit and scope of the present disclosure, are contemplated thereby, and are intended to be covered by the following non-limiting claims for all purposes.

What is claimed is:

1. A method for an estimation of three-dimensional object bounding boxes in a three-dimensional point cloud, the method comprising:
  given a three-dimensional point cloud, identifying and removing a ground plane from the three-dimensional point cloud, wherein the identifying and removing the ground plane from the three-dimensional point cloud comprises one or more of dividing the three-dimensional point cloud into height-thresholded radial bins and using the height-thresholded radial bins to distinguish ground plane points from foreground points, using a supervised classifier, and using a deep learning model;

clustering foreground points remaining after the ground plane is removed from the three-dimensional point cloud to generate one or more object clusters representing one or more objects;

extracting a feature from each of the one or more object clusters representing the one or more objects; and fitting a three-dimensional bounding box around each of the one or more object clusters representing the one or more objects.

2. The method of claim 1, further comprising providing the three-dimensional bounding box disposed around each of the one or more object clusters representing the one or more objects to an annotator as an annotation pre-proposal that can be modified by the annotator.

3. The method of claim 1, wherein the three-dimensional point cloud comprises a three-dimensional LIDAR point cloud obtained by a vehicular system.

4. The method of claim 1, wherein the three-dimensional point cloud and the three-dimensional bounding box disposed around each of the one or more object clusters representing the one or more objects are used to train a machine learning algorithm.

5. The method of claim 1, further comprising applying an angular orientation correction to the one or more object clusters representing the one or more objects.

6. The method of claim 1, wherein extracting the feature from each of the one or more object clusters representing the one or more objects comprises extracting the feature from each of the one or more object clusters representing the one or more objects using one or more of an Eigen value-based technique and an ensemble shape function-based technique.

7. The method of claim 1, further comprising comparing the extracted feature to a feature extracted from one or more previously-detected objects using one or more classifiers and predicting an object class label for one or more of the three-dimensional object bounding boxes as one or more pre-proposals.

8. The method of claim 1, wherein the clustering the foreground points remaining after the ground plane is removed from the three-dimensional point cloud to generate the one or more object clusters representing the one or more objects comprises applying one or more of a density-based spatial clustering of applications with noise algorithm and a Euclidean clustering-based method to detect the foreground points.

9. The method of claim 1, wherein the fitting of the three-dimensional bounding box around each of the one or more object clusters representing the one or more objects comprises identifying a three-dimensional cluster center, estimating three-dimensional extrema positions, estimating three-dimensional corner points that ensure three-dimensional bounding box tightness, and imposing angular rotation constraints to ensure alignment of each of the three-dimensional object bounding boxes with the ground plane.

10. A system for an estimation of three-dimensional object bounding boxes in a three-dimensional point cloud, the system comprising:

a processor comprising software executing coded instructions operable for:

given a three-dimensional point cloud, identifying and removing a ground plane from the three-dimensional point cloud, wherein the identifying and removing the ground plane from the three-dimensional point cloud comprises dividing the three-dimensional point cloud into height-thresholded radial bins and using the height-thresholded radial bins to distinguish ground plane points from foreground points;

clustering foreground points remaining after the ground plane is removed from the three-dimensional point cloud to generate one or more object clusters representing one or more objects;

extracting a feature from each of the one or more object clusters representing the one or more objects; and fitting a three-dimensional bounding box around each of the one or more object clusters representing the one or more objects.

11. The system of claim 10, wherein the coded instructions are further operable for providing the three-dimensional bounding box disposed around each of the one or more object clusters representing the one or more objects to an annotator as an annotation pre-proposal that can be modified by the annotator.

12. The system of claim 10, wherein the three-dimensional point cloud and the three-dimensional bounding box disposed around each of the one or more object clusters representing the one or more objects are used to train a machine learning algorithm.

13. The system of claim 10, wherein the coded instructions are further operable for applying an angular orientation correction to the one or more object clusters representing the one or more objects.

14. The system of claim 10, wherein extracting the feature from each of the one or more object clusters representing the one or more objects comprises extracting the feature from each of the one or more object clusters representing the one or more objects using one or more of an Eigen value-based technique and an ensemble shape function-based technique.

15. The system of claim 10, wherein the coded instructions are further operable for comparing the extracted feature to a feature extracted from one or more previously-detected objects using one or more classifiers and predicting an object class label for one or more of the three-dimensional object bounding boxes as one or more pre-proposals.

16. The system of claim 10, wherein the clustering the foreground points remaining after the ground plane is removed from the three-dimensional point cloud to generate the one or more object clusters representing the one or more objects comprises applying one or more of a density-based spatial clustering of applications with noise algorithm and a Euclidean clustering-based method to detect the foreground points.

17. The system of claim 10, wherein the fitting of the three-dimensional bounding box around each of the one or more object clusters representing the one or more objects comprises identifying a three-dimensional cluster center, estimating three-dimensional extrema positions, estimating three-dimensional corner points that ensure three-dimensional bounding box tightness, and imposing angular rotation constraints to ensure alignment of each of the three-dimensional object bounding boxes with the ground plane.

18. A method for identifying a similarly-shaped object in a feature-space associated with a three-dimensional point cloud, the method comprising:

extracting a plurality of features from an object cluster representing an object;

comparing the extracted plurality of features to a plurality of features extracted from one or more previously-detected objects; and when a match is found, providing an object label to a three-dimensional bounding box as a classified pre-proposal for the object cluster representing the object.

19. The method of claim 18, wherein extracting the plurality of features from the object cluster representing the object comprises extracting the plurality of features from the object cluster representing the object using an Eigen value-based technique.

20. The method of claim 18, wherein extracting the plurality of features from the object cluster representing the object comprises extracting the plurality of features from the object cluster representing the object using an ensemble shape function-based technique.

* * * * *